United States Patent [19]

Kamimura et al.

[11] Patent Number: 5,071,159

[45] Date of Patent: Dec. 10, 1991

[54] ACTIVE SUSPENSION SYSTEM OF VEHICLE

[75] Inventors: Katsuyoshi Kamimura, Sano; Saiichiro Oshita, Ota; Atsushi Mine, Gunma; Yutaka Hiwatashi; Toshihiro Konno, both of Ota, all of Japan

[73] Assignee: Fuji Jukogyo Kabushiki Kaisha, Tokyo, Japan

[21] Appl. No.: 490,497

[22] Filed: Feb. 28, 1990

[30] Foreign Application Priority Data

Apr. 24, 1987 [JP] Japan ............................. 62-101507
Apr. 24, 1987 [JP] Japan ............................. 62-101508

[51] Int. Cl.$^5$ ............................................. B60G 17/052
[52] U.S. Cl. ............................ 280/707; 280/DIG. 1
[58] Field of Search ................. 280/707, DIG. 1, 840, 280/6.12, 702, 703; 364/424.05

[56] References Cited

U.S. PATENT DOCUMENTS

| | | | |
|---|---|---|---|
| 4,616,846 | 10/1986 | Furuya et al. | 280/673 |
| 4,693,485 | 9/1987 | Kamei et al. | 280/707 |
| 4,700,971 | 10/1987 | Doi et al. | 280/707 |
| 4,765,648 | 8/1988 | Mander et al. | 280/707 |
| 4,787,649 | 11/1988 | Watanabe | 280/707 |
| 4,905,152 | 2/1990 | Kawabata | 280/707 |
| 4,934,731 | 6/1990 | Hiwatashi | 280/698 |

FOREIGN PATENT DOCUMENTS

| | | | |
|---|---|---|---|
| 219866 | 4/1987 | European Pat. Off. | 280/707 |
| 12434 | 1/1986 | Japan | 280/707 |
| 64510 | 4/1986 | Japan | 280/707 |
| 63-193907 | 8/1986 | Japan | 280/707 |

Primary Examiner—Kenneth R. Rice
Assistant Examiner—Karin Tyson
Attorney, Agent, or Firm—Martin A. Farber

[57] ABSTRACT

An active suspension system of an automotive vehicle having four air suspension units for four wheels has a first sensor for detecting vertical acceleration of the mass above each suspension unit spring, a second sensor for detecting the vertical relative displacement of the masses above and below each unit spring, a controller for operating in response to the output signals from the two sensors and a relative displacement velocity signal obtained by differentiation of the signal from the second sensor to generate an instruction air flow quantity signal, and a control valve operating in response to this flow quantity signal from each controller to control the charging or discharging of air into or from each unit. An auxiliary damper is provided in each unit to damp vibrations of relatively high frequencies. A low-pass filter is used to filter off a relatively high-frequency component of the output signal of at least the first sensor, whereby vibrations of relatively low frequencies are damped and absorbed by the operation of the air spring action of each unit according to the operation of the control valve.

2 Claims, 6 Drawing Sheets

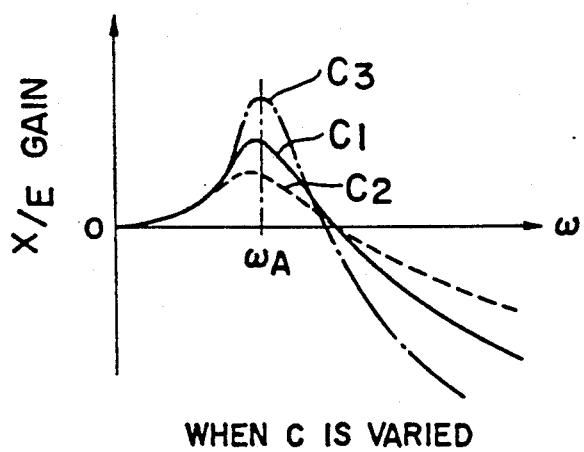
FIG. 3  WHEN C IS VARIED
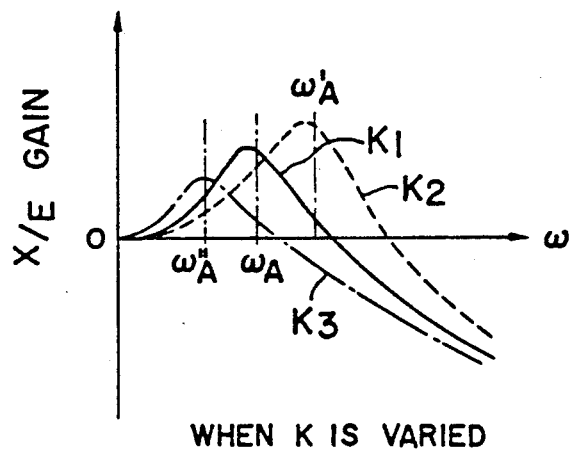
FIG. 4  WHEN K IS VARIED
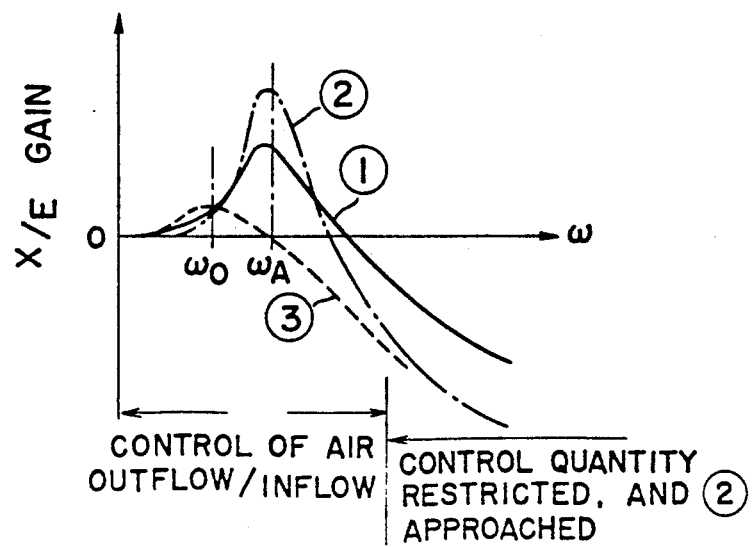
FIG. 5

ACTIVE SUSPENSION SYSTEM OF VEHICLE

RELATED APPLICATION

This is a continuation-in-part application of my copending patent application Ser. No. 07/182,984 filed Apr. 18, 1988, now abandoned.

BACKGROUND OF THE INVENTION

This invention relates generally to active suspensions of vehicles, particularly land motor vehicles. More particularly, the invention concerns a novel active suspension system of a vehicle which is designed to improve the riding comfort of the vehicle through consideration of the up-and-down (vertical) acceleration of the mass above each suspension spring, the relative vertical displacements and relative displacement velocities of the masses above and below each suspension spring In an automotive vehicle, a so-called active suspension system installed between the vehicle frame and the wheel assemblies has been known in the prior art (as disclosed, for example, in Japanese Patent Laid-Open Publication No. 213510/1984). In an active suspension system, the damping characteristics, provided by the gasliquid fluid springs of the suspension units in which these springs are used, are variably controlled in accordance with the relative displacement (mutually relative displacement quantity) in the up-and-down (vertical) direction of the wheel axles and the vehicle frame and the rate of variation with time of this relative displacement, that is, relative displacement velocity in the vertical direction.

In this known system, the nature of the road surface, i e., whether it is smooth or whether it is rough, is determined from the vertical-direction relative displacement and the relative displacement velocity of the wheel axles and the vehicle frame, and the damping force of the gas-liquid spring in each suspension unit is controlled to be low if the road surface is smooth and to be high if the road surface is rough. In the case where the road surface is judged to be smooth, the damping characteristic becomes soft, and ordinary riding comfort can be increased, but there arises a problem in that resonance of the mass above the spring cannot be suppressed, and a bouyant or wafting sensation is strongly felt.

Furthermore, when the vehicle is steered into a turn in the case where the road surface has been judged to be smooth, a rolling motion occurs. If, in order to prevent this rolling, a measure such as switching the damping force to a higher value is taken, the suspension at the time of turning will become stiff or hard, whereby the riding comfort will be greatly impaired.

Still another problem encountered in the above described active suspension system is that the required flow rates of the system fluids with respect to high-frequency vibration becomes extremely high and cannot be delivered without a tremendous increase in the capacities of the air compressor, oil pump, and other components, whereby increases in equipment cost and consumed energy cost cannot be avoided.

SUMMARY OF THE INVENTION

Accordingly, an object of this invention is to provide an active suspension system of a vehicle wherein, by appropriately separating the uses of the accelerations of the vehicle in the vertical direction and the vertical relative displacements of the suspension units, a soft suspension is continually presented with respect to the input from the road surface, and a stiff or hard suspension is presented with respect to forces acting directly on the vehicle frame side such as shifting of load due to causes such as turning, and wherein these functions can coexist in the system.

Another object of this invention is to provide an active suspension system of a vehicle having excellent suspension characteristics affording great riding comfort over the entire vibration frequency range with a low fluid flow quantity.

The above and other objects have been achieved by this invention, which concerns an active suspension system of a vehicle of the type wherein the discharging of the fluid in the suspension units supporting the vehicle body (including the frame and body) by the pressure of the fluid and the charging of the fluid into the suspension units are controlled by respective control valves which operate on the basis of determined quantities as respective signals from a controller.

In this system, according to this invention, the controller operates to calculate the determined quantities for charging or discharging the fluid in response to three kinds of information, namely, vertical acceleration signals from up/down (vertical) acceleration sensors for detecting vertical velocities above the suspension springs, vertical relative displacement velocities signals and vertical relative displacement signals obtained from signals from relative displacement sensors for detecting vertical relative displacements above and below the suspension springs. Then, according to basic operation, the fluid is charged when the vertical acceleration is in the downward direction and is discharged when the acceleration is in the upward direction, and, with respect to vertical relative displacement velocity and vertical relative displacement, discharging of the fluid within a suspension unit takes place when that suspension unit is in its extended direction and charging takes place when the suspension unit is in its contracted direction.

As a result of this operation of the controller and responding parts of the suspension system, the vertical vibrations or oscillations of the vehicle body are damped in response to the inputs from the road surface, and the vibrations or oscillations are thus not transmitted to the body, whereby an extremely soft riding feel can be attained. At the same time, rolling or pitching of the vehicle body with respect to load shifting at the time of turning or acceleration/deceleration is suppressed, and the vehicle body is continually maintained in a normal state. Thus, a great improvement in suspension performance is attained.

Furthermore, according to this invention, an auxiliary damper of low damping factor is installed in each suspension unit, and, at the same time, a low-pass filter for cutting off or separating a high-frequency component of each signal transmitted by each vertical acceleration sensor is provided. By these provisions, in the high-frequency region of the vertical acceleration, the control by outflow and inflow of fluids is restricted, and damping control principally by means of the auxiliary damper is approached. As a result, a soft riding feel and vibration characteristics of high damping ratio and good setting, which cannot be attained in generally known vehicles, can be obtained. At the same time, because of the restriction of control by fluid outflow and inflow with respect to vibrations in the high-frequency region, a predetermined reduction in the required quantity of the fluids is achieved. Accordingly, great reductions in the sizes and capacities of equipment such as the gas compressor and the oil pump as well as the quantity of required energy can be realized, whereby a great reduction in costs is made possible in practice In another aspect of this invention, together with the provision of the auxiliary damper of low damping factor in each suspension unit as described above, a low-pass filter for cutting off high-frequency components, for example, of the order of 4 to 5 Hz or higher of the detection signals of the aforementioned vertical acceleration sensor and relative displacement sensor is provided Then the high-frequency components of the vibrations are damped and absorbed by the auxiliary damper of low damping factor and the fluid spring characteristics of the suspension unit, while oscillations in the low-frequency region in the vicinity of the natural oscillatory frequency of vehicle body are suppressed by the fluid outflow and inflow of the suspension unit in response to the instruction signal from the aforementioned controller.

As a result, the vibration transmitting rate is low over the entire frequency range, whereby characteristics of good riding comfort are obtained. Additionally, motions such as bouncing, pitching, and rolling occurring in the low-frequency region are effectively damped and reduced, and so-called wafting or floating riding feel is eliminated, whereby ideal suspension characteristics are attained. Therefore, since control by outflow and inflow of fluids with respect to vibrations in the high-frequency region is not carried out, a predetermined reduction in the quantity of flow of the fluids is afforded, whereby an air compressor, oil pumps, and other equipment of low capacities are sufficient for high performance Thus the costs of equipment and energy can be greatly reduced.

The nature, utility, and further features of this invention will be more clearly apparent from the following detailed description with respect to preferred embodiments of the invention when read in conjunction with the accompanying drawings, briefly described below.

BRIEF DESCRIPTION OF THE DRAWINGS

In the accompanying drawings:

FIG. 3 is a graph indicating vibration characteristics in the case where damping is v. 'ed;

FIG. 4 is a graph indicating vib.. 'n characteristics in the case where the stiffness of a sp.. ' is varied;

FIG. 5 is a graph indicating the fundamental vibration characteristic and vibration characteristics obtained in the control of the air discharging and ing out of and into an air suspension unit in the system of the invention;

DETAILED DESCRIPTION OF THE INVENTION

Figure 1:
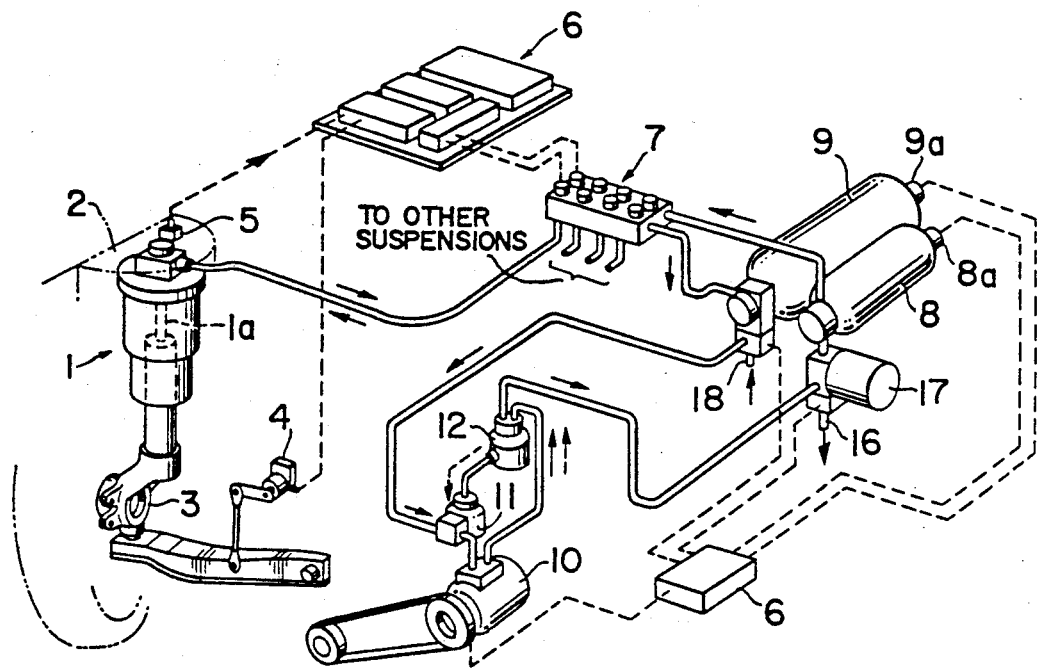
FIG. 1 is a schematic fluid circuit diagram, in perspective view, of an air charging and discharging system of an air suspension system according to one embodiment of this invention.
Figure 7:
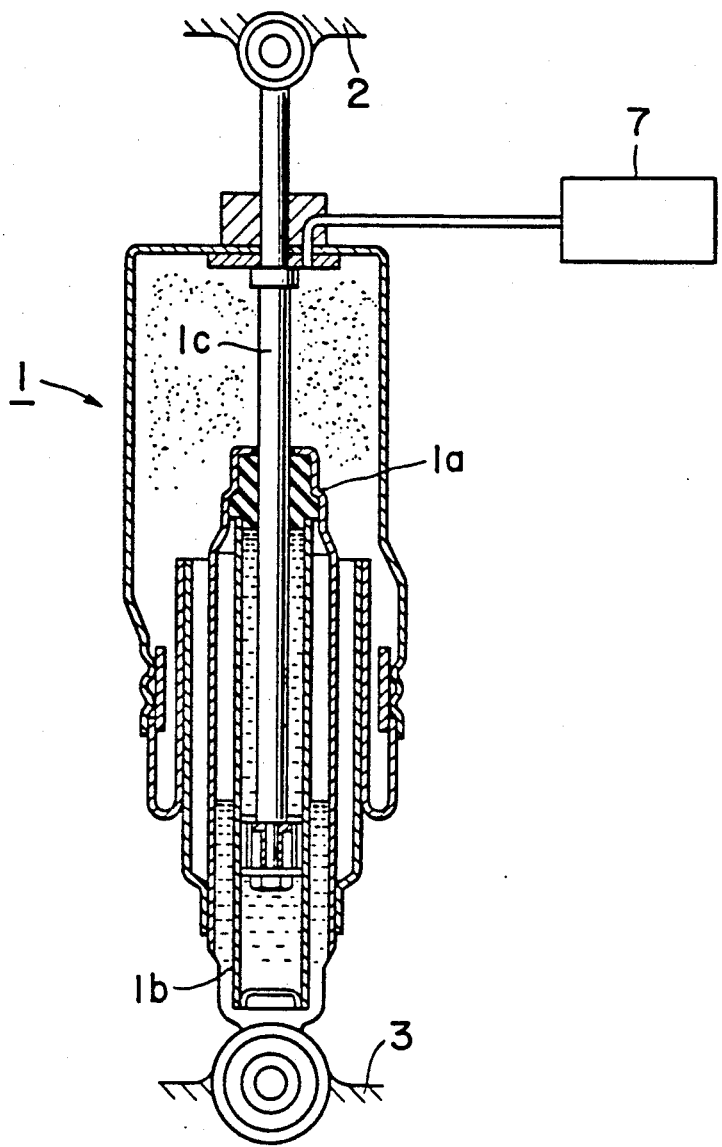
FIG. 7 is a vertical sectional view of the air suspension unit with an auxiliary damper.

Referring first to FIG. 1 showing one embodiment of this invention, a suspension assembly comprising an air suspension unit 1 (only one unit being shown) is provided between a frame member 2 forward on the vehicle body and a wheel axle support member 3. As shown in FIG. 7, this suspension assembly also has an auxiliary damper 1a comprising, for example, a cylinder member 1b connected at its lower end to the wheel axle support member 3 and a piston rod 1c fitted slidably in the axial direction within the cylinder member and connected at its upper end by way of an elastic member to the frame member 2 on the body.

Air is sealed within an air chamber formed between the auxiliary damper 1a and the piston rod, whereby, of the vertical vibration of the corresponding wheel, the high-frequency fraction (for example, of the order of 4 to 5 Hz or higher) is damped by the auxiliary damper 1a of low damping factor. Moreover, the downward load on the vehicle body is supported by the volumetric elasticity of the air sealed within the air chamber. By charging air into the air chamber or by discharging air from the air chamber, the height of the frame member 2 on the body side relative to the wheel axle, i.e., the wheel height can be varied, and moreover the spring constant can be varied.

The above described air suspension unit 1 is provided in each of the front-and-rear and left-and-right suspension parts. At each of these front-and-rear and left-and-right suspension parts, a relative displacement sensor 4 for detecting relative displacement in the up-and-down direction of the member on the wheel side, i.e., the member below the spring (air suspension unit 1) and the body side member (the mass), i.e., the member (the mass) above the spring (air suspension unit 1), (that is the sensor 4 detects relative displacement, namely the difference of the vertical displacements of the respective masses above and below the air suspension unit 1) and a vertical acceleration sensor 5 for detecting the vertical acceleration of the body, i.e., of the parts above the spring (air suspension unit 1), are respectively provided. The detection signals of the relative displacement sensor 4 and of the vertical acceleration sensor 5 are inputted into a controller 6 described hereinafter. For the purpose of simplifying description, only one of the front-rear, left-right suspension parts is shown in FIG. 1, the other parts being omitted since they are similar.

The supplying and discharging of air into and out of the air chambers in all air suspension units 1 are controlled by an air flow quantity control valve 7, which comprises four sets of valves, each set comprising a charging valve and a discharging valve. This control valve 7 is so constructed that the charging and discharging of air in each of the four front-rear, left-right air suspension units 1 are controlled at this control valve 7 separately and independently of those of the other suspension units.

An inlet port of the control valve 7 is connectd to a high-pressure air tank 8, while an outlet port of the control valve 7 is connected to a low-pressure air tank 9. The air pressure within the high-pressure tank 8 is maintained at a preset value amply higher than the air pressure within the air chamber of the air suspension unit 1 so that, when the charging valve of the flow quantity control valve 7 is opened, air will be supplied immediately into that air chamber. On the other hand, the interior of the low-pressure air tank 9 is maintained at a predetermined air pressure which is amply lower than the air pressure within the same air chamber so that, whe the discharging valve of the control valve 7 is opened, the air within the air chamber will immediately flow into the low-pressure air tank 9.

The air pressures within the high-pressure and low-pressure tanks 8 and 9 are respectively detected by pressure sensors 8a, 9a, which thereupon transmit corresponding detection signals. These signals are used to control the operation of, for example, an air compressor as described hereinbelow thereby to maintain the tank air pressures within predetermined pressure ranges.

When the pressure within the low-pressure air tank 9 becomes higher than a maximum preset value, this condition is detected by the above mentioned pressure sensor, 8a, 9a, and the resulting detection signal activates the controller 6 to start an air compressor 10, which thereby draws air from the interior of the low-pressure tank 9, compresses this air, and delivers it into the high-pressure tank 8. When the air pressure within the low-pressure tank 9 becomes lower than a predetermined value, the controller 6, operating in response to a signal from the pressure sensor, stops the compressor 10.

Also in the case where the internal pressure of the high-pressure tank 8 falls below a predetermined minimum value, the air compressor 10 is controlled to operate until the internal pressure of the high-pressure tank 8 reaches a preset maximum value, whereupon the air compressor 10 is stopped. When, at this time, the internal pressure of the low-pressure tank 9 falls below a predetermined value, a check valve 18 provided on the low-pressure side opens, and the air compressor 10 is controlled to draw in, not the air within the low-pressure tank 9, but the outside atmospheric air.

Since both the high-pressure and low-pressure air tanks 8 and 9 are in a state of equilibrium wherein their respective pressures are maintained within predetermined limits, the check valve 18 remains closed, and a closed air circuit is formed. However, at a time such as that when air is initially introduced into the system, the check valve 18 is opened, and the pressure within the high and low-pressure tanks 8 and 9 are equalized by drawing the atmosphere to a predetermined value and they are balanced each other.

The air compressed by the air compressor 10 is normally supplied through a drier 17 into the high-pressure tank 8. However, in the case where, the compressor 10 responsive to the pressure of the low-pressure tank 9 supplies the compressed air to the high pressure tank 8 through the drier 17, and a check valve 16 mounted on the drier 17 opens and releases pressurized air in the high pressure tank 8 through a silencer (not shown) to the atmosphere when the pressure within the tank 8 exceeds the predetermined maximum value, the pressure is reduced within the high-pressure tank 8 as regenerate dehumidifying material such as silica gel, for example, is regenerated within the drier 17.

In the example illustrated in FIG. 1, the air compressor 10 is supplied with lubricating oil from an oil tank 11 as a mixture with the air sucked into the compressor 10. The lubricating oil mixed with the compressed air delivered from the compressor 10 is separated from this air by an oil separator 12 and returned to the oil tank 11. In the case where the air compressor 10 is of a type not requiring the supply of a lubricating oil, a circulation circuit for a lubricating oil comprising an oil tank 11 and an oil separator 12 is unnecessary.

The air compressor 10 may be driven by any convenient motive power means such as the vehicle engine, the power from which being transmitted in an ON-OFF manner via a power transmission means such as an electromagnetic clutch, for example. Other driving means such as an electric motor can also be used.

The mode of control by the aforementioned controller 6 will now be described with reference to FIG. 2.

Figure 2:
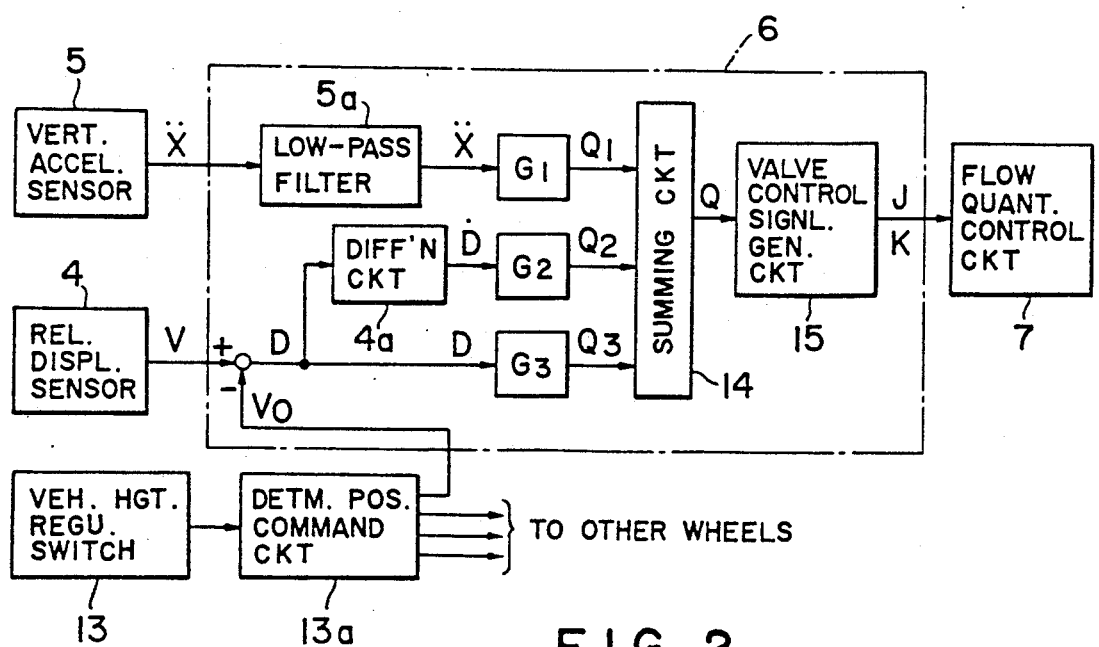
FIG. 2 is a block diagram showing one example of the control circuit of the controller shown in FIG. 1.

In FIG. 2 only one control circuit of a total of four for the front/rear left/right suspension units or assemblies is shown. The controller 6 is provided with four control circuits each as shown in FIG. 2. These four control circuits accomplish control in response to the signals transmitted from the vertical acceleration sensor 5 and the relative displacement sensor 4 of each of the suspension assemblies and to a reference or datum height position signal determined by a vehicle height regulating switch 13, whereby each suspension assembly is controlled independently as described below.

Each vertical acceleration sensor 5 detects the vertical acceleration of the vehicle body relative to one respective suspension unit and, according to this detected vertical acceleration, generates a vertical acceleration signal $\ddot{X}$. The high-frequency component of this signal X is cut off or separated by a low-pass filter 5a, and the resulting signal $\ddot{X}$ is multiplied by a gain $G_1$ corresponding to the mass M of the vehicle body, thereby being converted into an instruction flow quantity $Q_1$.

Each relative displacement sensor 4 detects the relative displacement in the vertical direction of the vehicle body and the corresponding wheel and generates a vehicle body vertical displacement signal V in accordance with the relative displacement thus That is the signal corresponding to the relative displacement V (or D) represents the difference of the vertical displacements of the respective masses above and below the air suspension unit 1 (the spring). From this signal V is subtracted a datum position signal $V_0$ which has been outputted through a datum position command circuit 13a by a selection operation of the vehicle height regulating switch 13 described hereinafter, whereby a true relative displacement signal D from the datum position is obtained. This true relative displacement signal D is divided into two paths, namely, a true relative displacement velocity signal Ḋ which has passed through a differentiation circuit 4a and the true relative displacement signal D as it is without change. These signals Ḋ and D are multiplied respectively by a gain $G_2$ corresponding to the damping coefficient C of the aforedescribed auxiliary damper 1a and by a gain $G_3$ corresponding to the spring constant $K_1$ of an auxiliary spring $K_1$ (FIG. 8), thereby being converted into instruction air flow quantities $Q_2$ and $Q_3$. $G_1$, $G_2$ and $G_3$ are coefficients of, or, predetermined values.

That is, if the pressure within the air chamber of the air suspension unit 1 is designated by P, and the effective cross-sectional area by A, the following motion equation is obtained.

$$-M\ddot{X}-C\dot{X}-KD+PA=0 \tag{1}$$

Here, $M\ddot{X}$, $C\dot{X}$, and $KD$ correspond respectively to instruction air flow quantities $Q_1$, $Q_2$ and $Q_3$ Therefore, $$PA = Q_1 + Q_2 + Q_3 \quad (2)$$

by substitution.

Accordingly, by supplying the total instruction air flow quantity Q resulting from the addition of the instruction air flow quantities $Q_1$, $Q_2$, and $Q_3$, vibration can be suppressed.

The vehicle height regulating switch 13 is a changeover switch for switching, for example, from normal vehicle height to high vehicle height. When this switch 13 is switched from normal height to high height, air is supplied into the air chamber of the air suspension unit 1, whereby the piston rod slides upward relative to the cylinder member, and this unit 1 is caused to extend. Accordingly, the height of the vehicle frame member 2 relative to the wheel axle is elevated by a predetermined value. This resulting height is taken as the vehicle datum height. When the vehicle height regulating switch 3 is switched from high height to normal height, the air within the air chamber is discharged, whereby the air suspension unit 1 is caused to contract, and the height of the vehicle frame member 2 relative to the wheel axle is returned to the low normal datum vehicle height.

Therefore, when the relative displacement sensor 4 is so set as to detect the relative displacement from the normal datum vehicle height as the datum position, in the case where the vehicle height regulating switch 13 is switched to high height, the value resulting from the subtraction of th difference between the normal datum vehicle height and the high datum vehicle height from the vehicle body side displacement detected by the relative displacement sensor 4 becomes the true relative displacement based on the high datum vehicle height as the datum position.

The vehicle height regulation as described above may be accomplished by automatic switching in response to a signal such as a signal resulting from the vehicle traveling speed instead of by manual switching. It will be obvious that, if the vehicle does not have a vehicle height regulation mechanism depending on a switch such as the vehicle height regulation switch 13, the relative displacement signal V of the relative displacement sensor 4 becomes continually equal to the true relative displacement signal D.

The determined air flow quantities $Q_1$, $Q_2$, and $Q_3$ Obtained in the above described manner are added in a summing circuit 14 and become a total instruction air flow quantity Q, which is transmitted to a valve control signal generating circuit 15, which accordingly transmits valve opening or closing signals J or K to the flow quantity control valve 7. Thus the pertinent charging or discharging valve of this control valve 7 is opened, and charging or discharging of air into or out of the air chamber in accordance with the total instruction flow quantity Q is carried out.

Basically according to this invention, control is so carried out that, in the suspension assembly of each wheel, when the vertical acceleration of the vehicle body is upward, the air within the air suspension unit is discharged, and when it is downward, air is charged into the suspension unit. Thus the vertical oscillations of the vehicle body are attenuated. In other words, with respect to the input from the road surface, the air suspension unit 1 becomes "soft" and is controlled in the direction which will not transmit oscillation or vibration to the vehicle body side. With respect to load shift such as that at the time of turning or sudden acceleration or deceleration, the unit is controlled in the direction (i.e., the direction for increasing the apparent rigidity or stiffness of the air suspension) for controlling rolling or pitching of the vehicle body.

The vertical relative displacement velocity and the vertical relative displacement of each suspension assembly discharge the air within the air suspension unit 1 when they are in the direction of extension of the air suspension unit 1, and charge air into the air chamber when they are in the direction of contraction, thereby functioning in the direction for returning the relative displacement of the suspension assembly to the datum position.

In terms of the mass $M_A$ above the spring (air suspension unit 1), the damping coefficient $C_A$, and the spring stiffness $K_A$ as basic values of a vehicle in general, the oscillatory characteristics can be expressed as follows.

$$\text{Natural frequency } \omega_A = \sqrt{\frac{K_A}{M_A}}$$

$$\text{Damping ratio } \zeta_A = \frac{C_A}{2\sqrt{M_A \cdot K_A}}$$

Since the mass $M_A$ above the spring (air suspension unit 1) of an ordinary vehicle is fixed, the variations of characteristics obtained by varying the damping coefficient $C_A$ and the spring stiffness $K_A$ are within the scopes indicated in FIGS. 3 and 4.

$C_A$ and $K_A$ are determined by the quantity of air charged into the air chamber of the air suspension unit 1. The spring stiffness $K_A$ is determined by the design of the auxiliary damper 1a.

More specifically, in the case where the damping coefficient $C_A$ has been varied, when the coefficients is increased as indicated in FIG. 3, the amplitude becomes small and the damping increases in a low-frequency region as indicated by damping coefficient $C_2$ relative to conventional damping coefficient $C_1$, but the transmitting rate X/E (X: vertical displacement of the vehicle, E: vertical displacement of the road surface) becomes high in a high-frequency region, and the riding feel becomes bumpy. When the damping coefficient is reduced, the transmitting rate becomes low in the high-frequency region as indicated by curve $C_3$, and the riding feel will become soft. In the low-frequency region, however, the amplitude becomes large, and the damping becomes poor.

In the case where the spring stiffness $K_A$ is varied, as indicated in FIG. 4, when the spring stiffness is ncreased, the resonance frequency $\omega_A$ becomes high as indicated by curve $K_2$ relative to conventional spring stiffness $K_1$. In the region (5 to 8 Hz) having the greatest influence on riding comfort, the transmitting rate is high, whereby the bumpy riding feel becomes strong, and the damping ratio also becomes poor. On the other hand, when the spring stiffness is decreased, the resonance frequency becomes low as indicated by curve $K_3$. In the region having the greatest influence on riding comfort, the transmitting rate is low, and the oscillation absorption is good, whereby the damping ratio is strengthened, and convergence is good. However, whe n the stroke of the suspension assembly becomes excessively long, the suspension assembly cannot be mounted on the conventional vehicle such as the long suspension assembly.

Accordingly, in the practice of this invention, in the case where the vertical displacement of the mass above each spring is small, and control of the outflow and inflow of air out of and into the suspension unit is not carried out, the spring stiffness $K_A$ is made to assume a value of the order of the ordinary value of a conventional vehicle, and at the same time the damping coefficient of the auxiliary damper 1a is set at a value smaller than the ordinary value. Then, the fundamental vibration characteristic becomes as indicated by curve ② in FIG. 5 which has a feeling of a wafting or floating riding sensation, the characteristics become those of good riding comfort.

On the other hand, in the case where the vertical displacement of the mass above the spring is large, and control of outflow and inflow of air of the air suspension unit is operated, the natural vibration frequency $\omega_0$ is set at a value smaller than the normal value $\omega_A$, and the damping ratio $\zeta_0$ is set at a value greater than the normal value $\zeta_A$, thereby to obtain a vibration characteristic as indicated by curve ③ in FIG. 5. At the same time, the gains $G_1$, $G_2$, and $G_3$ are so determined that the apparent spring stiffness $K_0$ will become smaller than the normal value $K_A$ so that, with respect to the force applied to the vehicle body, the vehicle body displacement will be less. In this connection, the low-pass filter 5a greatly restricts the control by outflow and inflow of air of the high-frequency region, in which the auxiliary damper 1a functions to damp the vibrations. The gains have large values to cause hard spring stiffness of the suspension unit with respect to a force applied to the vehicle body.

By these measures, the transmitting rate becomes low and the riding feel becomes soft over a wide range of frequencies. At the same time, by increasing the spring stiffness ($K_0 < K_A$), the suspension stroke in the low-frequency region is held within a range wherein it does not become very large, and an ideal suspension characteristic without a floating riding feel can be obtained.

Figure 7A:
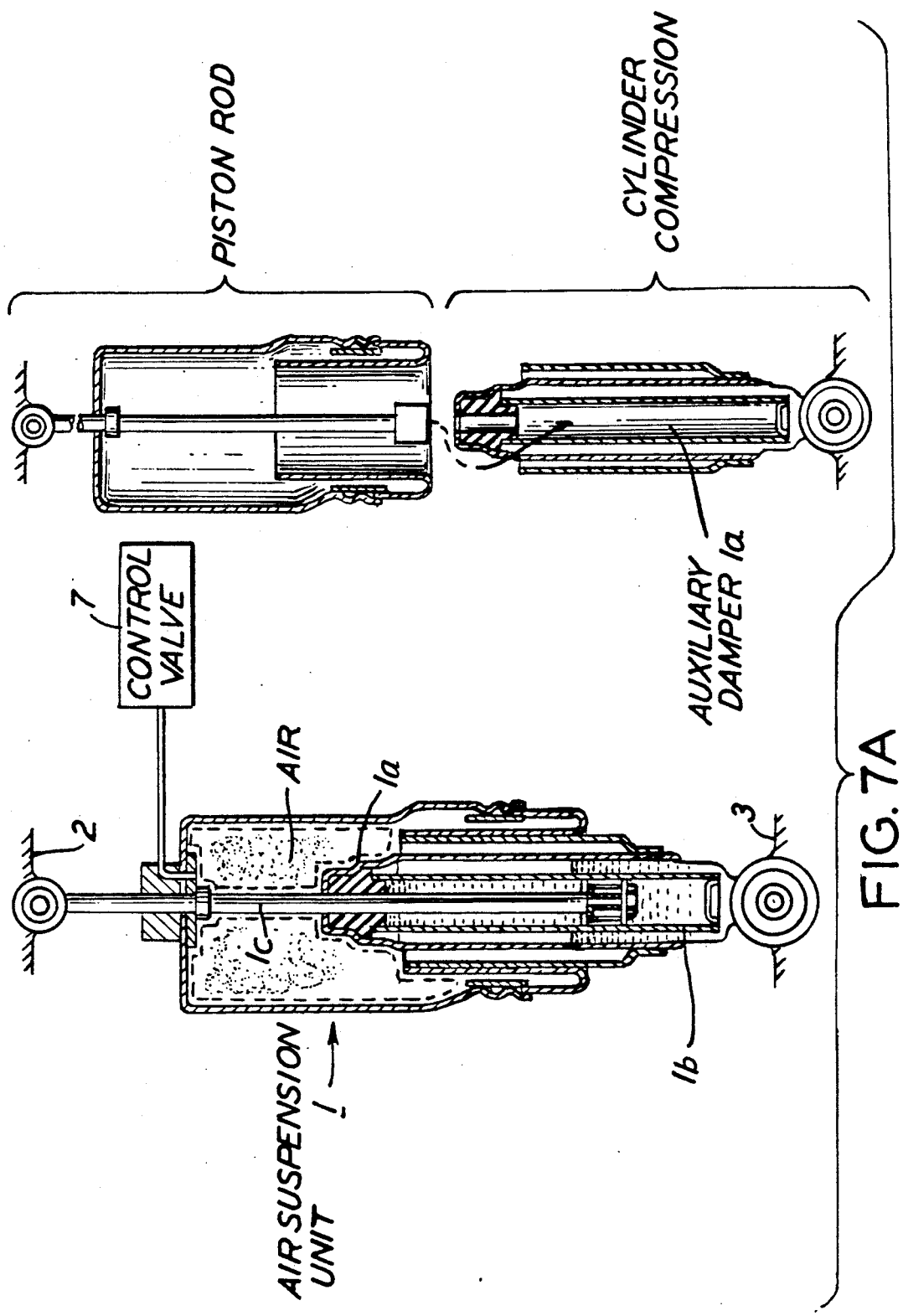
FIG. 7A shows an exploded view of the air suspension unit according to the invention.

In the high-frequency region of the vertical acceleration, the control by outflow and inflow of the air from and into the air suspension unit 1 is restricted, and the auxiliary damper 1a operates to damp vibrations in a high frequency range. FIG. 7A shows an exploded view of the fluid suspension assembly comprising the air suspension unit 1 and the auxiliary damper 1a. Also see, FIG. 8.

In the example illustrated in FIG. 2, a high-pass filter (not shown) for cutting off the low-frequency component of the order of 0.1 Hz or less, for example, is provided in series with the low-pass filter 5a in the input circuit from the vertical acceleration sensor 5. Control of the charging and discharging of air based on vertical acceleration caused by an inclination angle of steeper slope is prevented by the provision of this high-pass filter.

Furthermore, in the example shown in FIG. 2, a low-pass filter may be provided in the input circuit from the relative displacement sensor 4 thereby to separate the high-frequency region. However, since the amplitude of the high-frequency region of the vertical relative displacement is very small, and the discharging and charging of air is thereby of small quantity, there is almost no problem in practice even when such a low-pass filter is not provided.

The above described example illustrates an application of this invention to an air suspension system in which air is used as a spring. However, if the closed circuit for air is so adapted that the balance between the charging and discharging of air is amply maintained, and there is almost no necessity of supplying or discharging air into or out of this closed circuit, a gas other than air can be used in the circuit. Furthermore, the above described example illustrates a case wherein a flow quantity control valve is used. However, in another possible arrangement, a pressure control valve is provided in addition to the flow quantity control valve, and the controller calculates the determined quantity of the gas to be charged or discharged from the vertical acceleration signal, the vertical relative displacement velocity signal, and the vertical relative displacement signal. Then, a signal for variably controlling the pressure setting value of the pressure control valve is generated and transmitted so as to cause the charging or discharging of the gas of a quantity corresponding to that instruction quantity.

This invention is further applicable also to a vehicle in which a hydropneumatic suspension system is used. In this case, the charging valve or discharging valve of the flow quantity control valve is opened in response to a valve opening/closing signal from the controller. As a result, control is carried out so that oil maintained at a predetermined pressure within an accumulator by an oil pump is charged into an oil cylinder of the suspension assembly, or the oil within the oil cylinder of the suspension assembly is drained into a reservoir. In this case also, the calculation of the determined flow quantity of charging and discharging due to the controller, opening/closing control of the flow quantity control valve based on the determined flow quantity thus calculated, the functional capability derived from this control, and other features are the same as those in the case of the aforedescribed suspension system.

Figure 6:
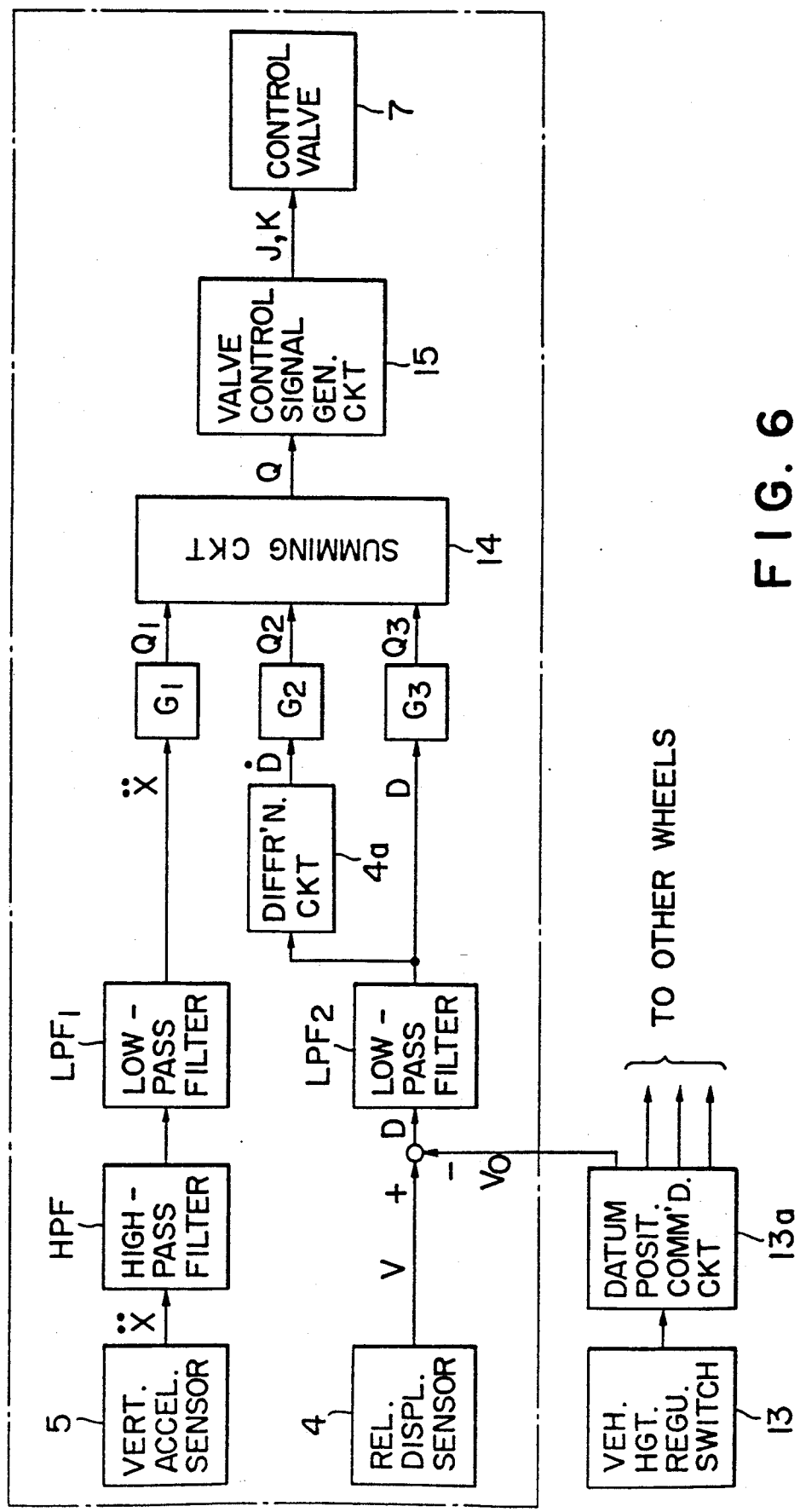
FIG. 6 is a block diagram showing a control circuit of the controller according to another embodiment of the invention.

In another embodiment of this invention as shown in FIG. 6, the vertical acceleration of the vehicle body is detected by the vertical acceleration sensor 5, and the resulting vertical acceleration signal $\ddot{X}$ is fed into a high-pass filter HPF, where its low-frequency zone (for example, range of the order of 0.1 Hz or lower) is cut off. The resulting signal is further passed through a low-pass filter $LPF_1$, where its high-frequency zone of the order of 4 to 5 Hz is cut off. The resulting signal is multiplied by a gain $G_1$ corresponding to the mass M on the vehicle side and is thereby converted into a determined flow quantity $Q_1$.

The relative displacement sensor 4 delects vertical relative displacement of the vehicle body and the pertinent wheel and accordingly generates a vehicle vertical displacement signal V. From this signal V is subtracted a datum position signal $V_0$ which has been outputted through a datum position command circuit 13a in accordance with the selection of a vehicle height regulating switch 13 described hereinafter. As a result, a true relative displacement signal D representing the true relative displacement from the datum position is obtained and is fed through a low-pass filter $LPF_2$, where its high-frequency zone of the order of, for example, 4 to 5 Hz, is cut off. The resulting signal is then divided into a true relative displacement velocity signal Ḋ, which has been passed through a differentiation circuit 4a, and the true related displacement signal D as it is. These signals D and Ḋ are then multiplied respectively by gains $G_2$ and $G_3$ to be converted into determined flow quantities $Q_2$ and $Q_3$.

Figure 8:
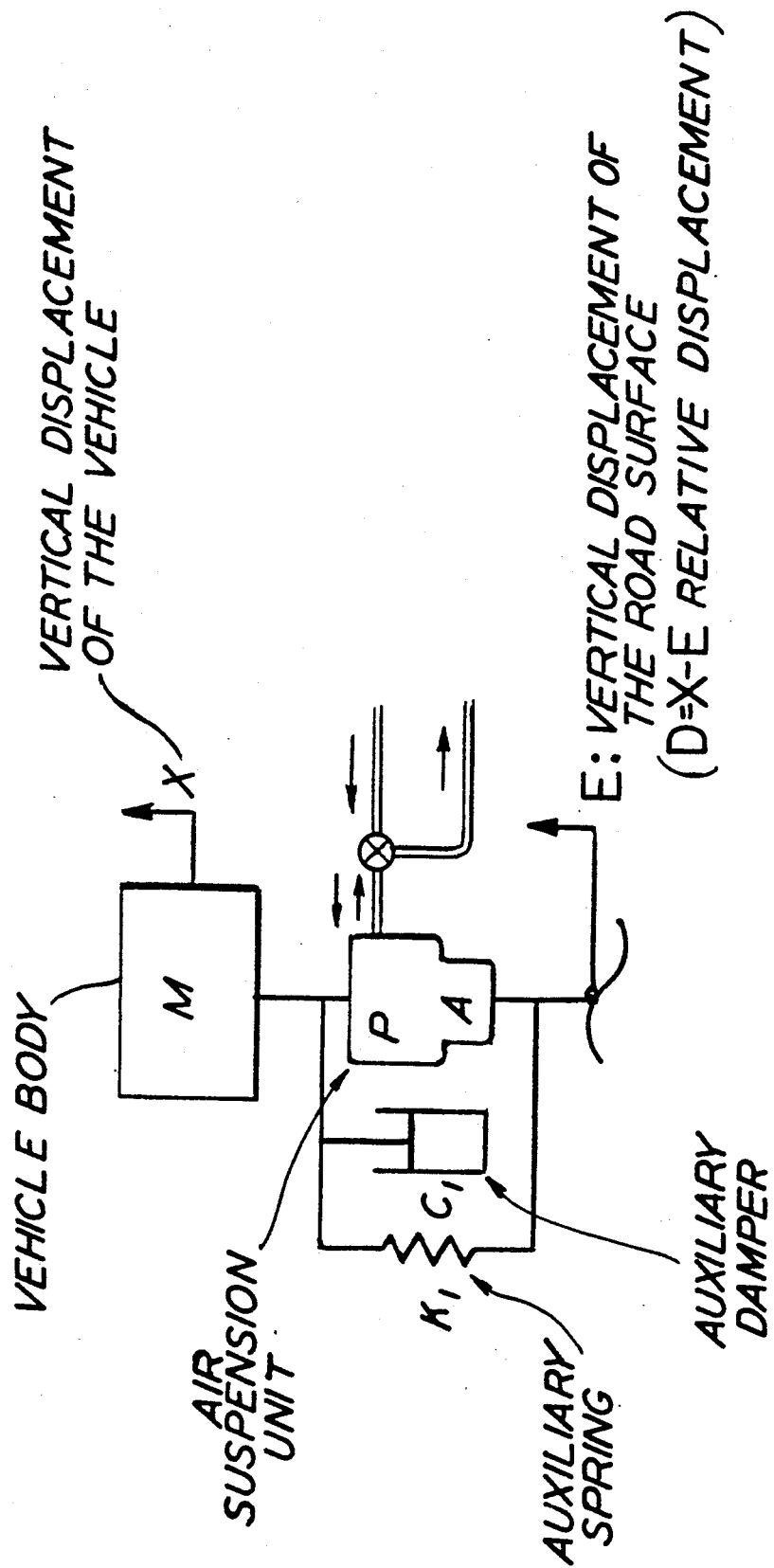
FIG. 8 is a schematic diagram illustrating the overall system of the invention and showing an auxiliary spring.

Here, the gain $G_2$ corresponds to the damping coefficient C of the auxiliary damper $1a$, while the gain $G_3$ corresponds to the spring constant $K_1$ of the auxiliary spring (FIG. 8).

Since the high-frequency component related to relative displacement is actually of a small order, this operation is possible to control the air suspension system without the low-pass filter $LPF_2$.

The instruction air flow quantities $Q_1$, $Q_2$, and $Q_3$ obtained in the above described manner are added in the summing circuit 14, which thereby outputs a total instruction air flow quantity Q, which is fed into the valve control signal generating circuit 15. This circuit 15 outputs the signal to the control valve 7, and either one of the charging and discharging valves of this control valve 7 is opened. As a result, charging or discharging of air is carried out into or out of the air chamber corresponding to the above described total instruction flow quantity Q.

With respect to the input on the vehicle side, such as load shifting, the controls operated in response to the signals from the vertical acceleration sensor 5 and the relative displacement sensor 4 act in the same direction, and the control for maintaining the vehicle body continually in a horizontal state is facilitated.

In the above described control operation, air in the air suspension is discharged when the vertical acceleration is upward and is charged into the air suspension when the vertical acceleration is downward. With this mode of control, if the discharging of air is continued when the vehicle begins, for example, to climb an uphill slope, and an upward acceleration occurs, or if charging of air is continued on a downhill slope, the control will be adversely affected. Accordingly, since the frequency of the vertical acceleration caused by the inclination of the road surface at climbing the vehicle on the uphill road is much lower than the vertical acceleration frequency caused by a bumpy road surface, the above mentioned problem is overcome by interposing a high-pass filter HPF in the signal circuit of the vertical acceleration sensor 5 thereby to separate the very low-frequency portion of the signal.

According to this invention, therefore, the low-pass filters $LPF_1$ and $LPF_2$ for filtering off the high-frequency components of the detection signs of the vertical acceleration sensor 5 and the relative displacement sensor 4 are provided, and, at the same time, an auxiliary damper $1a$ of low damping factor is provided in the air suspension unit 1. Then, control of the outflow and inflow of air with respect to vibrations of high frequencies above the order of 4 to 5 Hz is discontinued, and vibrations of this high-frequency zone are damped by the auxiliary damper $1a$ of low damping factor and the air spring characteristic of the air suspension unit 1 of low vibration transmitting rate. With respect to vibrations or oscillations in the lower frequency region in the vicinity of the natural frequency above the spring, these oscillations are suppressed by control of the outflow and inflow of air of the air suspension assembly in accordance with the commands of the controller 6 as described hereinbefore. As a result, reduction of bouncing, pitching and rolling occurring at frequencies in the vicinity of, for example, 1 to 2 Hz and prevention of the floating feel accompanying these motions. are accomplished, and as an overall effect, the riding comfort of the vehicle is remarkably improved.

As a result of the elimination of control of the air outflow and inflow in the air suspension assembly for suppressing vibrations in the high-frequency region, the flow of air is greatly reduced and ca be amply handled by an air compressor of low capacity, whereby the equipment and operational energy costs are remarkably reduced.

What is claimed is:

1. An active suspension system of a vehicle with a vehicle body and a vehicle wheel, comprising a fluid suspension assembly coupled to a support member of said wheel at one end of said fluid suspension assembly and to a frame member of said vehicle body at another end of said fluid suspension assembly, a vertical acceleration sensor for detecting acceleration in a vertical direction of a mass above said suspension assembly and for generating a corresponding vertical acceleration signal, and a relative displacement sensor for detecting relative displacement in a vertical direction of mass above said suspension assembly and other mass below said suspension assembly for generating a corresponding vertical relative displacement signal, the improvement in said system wherein:

said fluid suspension assembly comprises a fluid suspension unit and an auxiliary damper with a low constant damping factor mounted on said suspension unit, said fluid suspension unit to be charged and discharged with fluid for generating damping and spring action between said vehicle body and said support member to support said vehicle body, said auxiliary damper for damping a high-freqency component of a vertical vibration of said wheel;

filter means for filtering said vertical acceleration signal in order to separate off a high-frequency component thereof and to pass a low-frequency component thereof by generating a filtered vertical acceleration signal, and for supplying said low-frequency component of the separated vertical acceleration signal to said fluid suspension unit so as to control said suspension unit by charging and discharging the fluid into and from said suspension unit against vibrations of relatively low frequencies;

differentiating means for differentiating said vertical relative displacement signal so as to provide a vertical relative displacement velocity signal;

calculating means for multiplying each said filtered vertical acceleration signal, said vertical relative displacement signal and said vertical relative displacement velocity signal by corresponding gains for generating respective fluid quantity signals, said gains have large values to cause hard spring stiffness of said suspension unit with respect to a force applied to said vehicle body;

control means responsive to said fluid quantity signals for calculating an instruction quantity of the fluid to be charged into and discharged from said suspension unit and for generating a corresponding valve control signal;

a control valve responsive to said valve control signal for controlling said charging and discharging of said fluid into and from said suspension unit; and means for charging and discharging said fluid under pressure via said control valve into and from said suspension unit.

2. The active suspension system according ot claim 1, further comprising another filter means responsive to said vertical relative displacement signal for filtering said vertical relative displacement signal to separate off a high-frequency component thereof and to pass a low-frequency component thereof for supplying a filtered vertical relative displacement signal to said differentiating means and to said calculating means so as to prevent a stroke of said suspension unit from becoming excessively large.

* * * * *